United States Patent
Comparat et al.

(10) Patent No.: US 12,538,906 B2
(45) Date of Patent: Feb. 3, 2026

(54) TRAY FOR FARMING INSECTS, SUITABLE FOR INDUSTRIAL-SCALE FARMING

(71) Applicant: Ynsect, Évry-Courcouronnes (FR)

(72) Inventors: Solène Comparat, Vasselin (FR); Thibault Sarton Du Jonchay, Chevrières (FR); Pedro Escalante, Dolores (ES)

(73) Assignee: YNSECT, Évry-Courcouronnes (FR)

(*) Notice: Subject to any disclaimer, the term of this patent is extended or adjusted under 35 U.S.C. 154(b) by 0 days.

(21) Appl. No.: 18/038,865

(22) PCT Filed: Dec. 3, 2021

(86) PCT No.: PCT/FR2021/052196
§ 371 (c)(1),
(2) Date: May 25, 2023

(87) PCT Pub. No.: WO2022/123153
PCT Pub. Date: Jun. 16, 2022

(65) Prior Publication Data
US 2024/0206443 A1    Jun. 27, 2024

(30) Foreign Application Priority Data
Dec. 7, 2020  (FR) ........................................ 2012795

(51) Int. Cl.
*A01K 67/30*    (2025.01)
(52) U.S. Cl.
CPC .................................... *A01K 67/30* (2025.01)
(58) Field of Classification Search
CPC .............................. A01K 67/033; A01K 67/30

USPC ........................................................... 119/6.5
See application file for complete search history.

(56) References Cited

U.S. PATENT DOCUMENTS

| | | | | |
|---|---|---|---|---|
| 2,255,036 A | * | 9/1941 | Gedge .................. | A01K 41/065 414/404 |
| 3,106,332 A | * | 10/1963 | Dieguez ................. | B65D 5/004 206/821 |
| 3,341,064 A | * | 9/1967 | Ricci ..................... | B65D 81/261 220/608 |

(Continued)

FOREIGN PATENT DOCUMENTS

| | | |
|---|---|---|
| CN | 209105993 U | 7/2019 |
| FR | 3034622 A1 | 10/2016 |

(Continued)

*Primary Examiner* — Timothy D Collins
*Assistant Examiner* — Maria E Graber
(74) *Attorney, Agent, or Firm* — Panitch Schwarze Belisario & Nadel LLP; Erin M. Dunston

(57) ABSTRACT

The invention relates to a tray for farming insects, comprising a solid bottom (2) that defines a substantially horizontal plane, and side walls (4) defining a peripheral enclosure (5) of the tray. The bottom (2) and the side walls (4) define a tray body. The tray comprises feet (6) that extend vertically from the bottom (2) of the tray to a level above the enclosure (5) of the tray. The feet make it possible for an identical insect farming tray to be stacked on top of the farming tray while creating a space between the bottom (2) of said identical tray and the enclosure (5) of the tray. The body of the tray has no sharp edges in order to limit disruption to a laminar air flow flowing around the tray. The invention also relates to a stack of multiple trays of this type.

17 Claims, 6 Drawing Sheets

(56) References Cited

U.S. PATENT DOCUMENTS

| | | | | |
|---|---|---|---|---|
| 3,905,510 A * | 9/1975 | Johnson | B65D 1/34 | |
| | | | 220/675 | |
| 4,227,642 A * | 10/1980 | Ortel | B65D 5/004 | |
| | | | 206/510 | |
| 4,671,411 A * | 6/1987 | Rehrig | B65D 21/048 | |
| | | | 294/169 | |
| D322,705 S * | 12/1991 | Rasmussen | D34/38 | |
| 5,179,913 A * | 1/1993 | Cannon | A01K 41/02 | |
| | | | 119/300 | |
| 5,415,293 A * | 5/1995 | Ackermann | B65D 81/263 | |
| | | | 206/505 | |
| 5,494,163 A * | 2/1996 | Apps | B65D 21/062 | |
| | | | 206/506 | |
| 5,819,685 A * | 10/1998 | Kappelt | A01K 67/30 | |
| | | | 119/6.5 | |
| 6,016,627 A * | 1/2000 | Nobile | A01G 18/62 | |
| | | | 47/1.1 | |
| 7,086,924 B2 * | 8/2006 | Mills | A01K 47/00 | |
| | | | 119/6.5 | |
| 8,997,993 B2 * | 4/2015 | Shapiro | B65D 21/0212 | |
| | | | 220/4.27 | |
| 9,469,470 B2 * | 10/2016 | Stahl | B65D 85/36 | |
| 9,629,339 B2 * | 4/2017 | Newton | A01K 29/00 | |
| 10,362,772 B2 * | 7/2019 | Arsiwalla | A01K 67/33 | |
| 10,835,925 B2 * | 11/2020 | Sobecki | B07B 1/46 | |
| 11,363,803 B2 * | 6/2022 | Ritz | A01K 49/00 | |
| 11,622,548 B2 * | 4/2023 | Urbanski | A01K 67/30 | |
| | | | 119/6.5 | |
| 11,638,410 B2 * | 5/2023 | Calis | A01K 29/005 | |
| | | | 119/6.5 | |
| 11,653,637 B2 * | 5/2023 | Massaro | A01K 67/30 | |
| | | | 119/6.5 | |
| 11,882,817 B2 * | 1/2024 | De Gelder | A01K 67/30 | |
| 2009/0007853 A1 * | 1/2009 | Johnson | A22B 3/086 | |
| | | | 452/57 | |
| 2011/0290464 A1 * | 12/2011 | Mabes | F28F 9/02 | |
| | | | 165/173 | |
| 2013/0319334 A1 * | 12/2013 | Newton | A01K 5/00 | |
| | | | 119/51.01 | |
| 2015/0375898 A1 * | 12/2015 | Matsuda | B65D 21/045 | |
| | | | 206/449 | |
| 2016/0066552 A1 * | 3/2016 | Arsiwalla | A01K 67/33 | |
| | | | 119/6.5 | |
| 2018/0370711 A1 * | 12/2018 | Grove | B65D 81/3205 | |
| 2022/0287284 A1 * | 9/2022 | Martínez Escribano | | |
| | | | A01K 67/30 | |
| 2022/0304290 A1 * | 9/2022 | De Gelder | B65D 85/50 | |
| 2023/0137385 A1 * | 5/2023 | Dunn | A01K 67/30 | |
| | | | 119/322 | |
| 2023/0363364 A1 * | 11/2023 | Renoux | B65D 21/0215 | |
| 2023/0371443 A1 * | 11/2023 | Eek et al. | A01G 9/203 | |
| 2023/0392865 A1 * | 12/2023 | MacGowan | F26B 25/063 | |
| 2024/0032517 A1 * | 2/2024 | De Gelder | A01K 67/362 | |
| 2024/0099280 A1 * | 3/2024 | Oggeri | A01K 67/30 | |
| 2024/0130333 A1 * | 4/2024 | Torrie | A01K 49/00 | |

FOREIGN PATENT DOCUMENTS

| | | | | |
|---|---|---|---|---|
| FR | 3046333 A1 | 7/2017 | | |
| FR | 3088519 A1 | 5/2020 | | |
| GB | 1109015 A | 4/1968 | | |
| WO | WO-9951081 A1 * | 10/1999 | | A01G 18/60 |
| WO | WO-2020104751 A1 | 5/2020 | | |
| WO | WO-2020246878 A1 * | 12/2020 | | A01K 67/033 |

* cited by examiner

TRAY FOR FARMING INSECTS, SUITABLE FOR INDUSTRIAL-SCALE FARMING

CROSS-REFERENCE TO RELATED APPLICATIONS

This application is a U.S. National Stage Application pursuant to 35 U.S.C. § 371 of International Patent Application PCT/FR2021/052196, filed on Dec. 3, 2021, and published as WO 2022/123153 on Jun. 16, 2022, which claims priority to French Patent Application FR2012795, filed on Dec. 7, 2020, all of which are incorporated herein by reference in their entireties for all purposes.

The present invention relates to a tray for farming insects.

The insects preferentially targeted by the invention are, for example, coleoptera, diptera, lepidoptera, isoptera, orthoptera, hymenoptera, blattoptera, eemiptera, eeteroptera, ephemeroptera and mecoptera, preferably coleoptera, diptera, orthoptera, lepidoptera. For example and in a non-exhaustive way, the tray object of the invention may be suited to farming of beetles belonging to the families of Tenebrionidae, Melolonthidae, Dermestidae, Coccinellidae, Cerambycidae, Carabidae, Buprestidae, Cetoniidae, Dryophthoridae, at all stages of development thereof, and for farming of diptera belonging to the Stratiomyidae, Muscidae, Calliphoridae families at their larval stage of development.

The tray object of the invention is particularly suitable for farming the following beetles: *Tenebrio molitor*, *Alphitobius diaperinus*, *Zophobas morio*, *Tenebrio obscurus*, *Tribolium castaneum* and *Rhynchophorus ferrugineus*, at all stages of development thereof, and quite particularly for farming *Tenebrio molitor* (or mealworm), and that of the following diptera: *Hermetia illucens*, *Musca domestica*, *Chrysomya megacephala*, at their larval stage of development.

Unless stated otherwise, the term "insect" is used to refer to any stage of development from the egg or ootheca to the adult insect.

Large-scale insect production has many interests, especially in the agro-industry. Indeed, some species of edible insects are rich in protein and could be used in particular for animal feed, for fish, crustaceans, and certain birds. Large-scale insect farming is also interesting in other industrial fields. For example, the exoskeleton of insects is predominantly made up of chitin, a known derivative of which is chitosan. The applications of chitin and/or chitosan are numerous: cosmetics (cosmetic composition), medical and pharmaceutical (pharmaceutical composition, treatment of burns, biomaterials, corneal dressings, surgical threads), dietetics and food, technical (filtering agent, texturiser, flocculent or adsorbent, in particular for the filtration and depollution of water), etc.

The document FR3034622 discloses a workshop suited for farming of insects on a large scale, i.e. on an industrial scale. By industrial scale, it should be understood, for example, the production of several hundred or several thousand tonnes of insect larvae per year. Farming implements farming trays (typically trays) which are stacked to form basic farming units. The elementary farming units are stored in a first area, and, when a farming operation should be carried out, the trays are brought to a position suitable for carrying out the operation, grouped into elementary farming units or individually separated.

Farming operations relate in a non-exhaustive manner to feeding, water supply, calibrating insects, adding insects in farming containers, and numerous and various sorting operations allowing separating or classifying, during farming, insects according to their stage of evolution, or separating living insects from dead insects and/or from their farming environment, etc.

Farming of insects on a large scale and in a highly automated manner requires farming containers that meet multiple functional criteria, in particular resistance, ability to be moved by automated means, optimisation in terms of used volume, sanitary compatibility, possibility of food or water supply.

The document FR3046333 discloses an insect farming tray, suitable for use in large-scale farming. The tray proposed in this document is stackable on ribs guaranteeing a regular and reliable stacking while allowing for a good aeration of the trays thanks to wide openings maintained between the stacked trays, and includes sides that are particularly suited for gripping thereof by automated means.

The document FR3088519 relates to an insect farming workshop, and more particularly to the climatic regulation of at least one area of such a workshop. This document discloses the importance of maintaining controlled and homogeneous environmental conditions in an insect farm, favourable to the health, well-being and rapid growth of the insects This document discloses airflow systems optimised to achieve an optimised air extraction in the workshop, particularly in the complex context of vertical farming.

An object of the present invention is to provide an insect farming tray for large-scale, in particular vertical, farming which is optimised with regards to many important farming parameters, in particular climatic and aeraulic criteria.

Thus, the invention relates to a tray for farming insects, including a solid bottom, defining a substantially horizontal plane, and side walls defining a peripheral enclosure of the tray. The bottom and the side walls define a tray body. The tray includes feet extending vertically from the bottom of the tray up to a level located above the enclosure of the tray. The feet of the tray are configured to enable stacking on top of said farming tray of an identical insect farming tray, while leaving a space between the bottom of said identical tray and the enclosure of the tray. For this purpose, the feet of the tray include an upper bearing surface configured to cooperate with a lower bearing surface of the feet of said identical tray. The body of the tray has no sharp edges, so as to limit disruptions to a laminar airflow flowing around the tray.

Furthermore, the feet may have no vertical sharp edges.

The absence of sharp edges enables an airflow to flow around the tray, without creating local disruptions likely to disturb this flow and/or create local irregularities in this flow. The use of feet that protrude from the enclosure of the tray allows maximizing the open surface present between the trays, much more than the indentations generally made for this purpose in the upper portion of the walls of insect farming trays. This allows facilitating the flow of air between the trays and therefore the renewal and maintenance at the desired temperature of the air available to the insects. For the same open surface between two stacked trays, the distance between the bottoms of the two trays may be shorter, which allows maximizing the number of trays for a given stacking height (which enables farming of more insects over the same height, or lowering the centre of gravity of a stack consisting of a predetermined number of trays, which is mechanically desirable).

The body of the tray may have a rectangular parallelepiped general shape with a small height in comparison with its length and its width and then includes rounded vertical edges. The bottom of the tray may include, at each of its longitudinal ends, a raised portion with respect to the horizontal.

Thus, features allowing further limiting the aerodynamic disruptions of an airflow crossing a column of farming trays are proposed.

The proposed features also have the consequence of predisposing the tray to be used according to a given orientation with respect to the airflow. Thus, the air flow should advantageously arrive via one of the short sides of the tray, and ideally substantially perpendicular to these short sides. The rounded edges and the raised portion of the bottom of the tray (which confer thereon a shape similar to that of an otherwise flat-bottomed boat hull) allow for a reduction in the drag coefficient of the tray (often denoted by the abbreviation Cx).

In particular, the tray may include four feet, two of said four feet being located on a first long side of the tray extending along its length, and two of said four feet being located on a second long side of the tray extending along its length, said four feet being located at a distance from a first short side of the tray extending along its width and a second short side of the tray extending along its width.

The position of the feet at a distance from the side of the tray intended to receive the airflow (generally the smallest side of the tray) allows for a better air entry into the tray. In general, this improves the flow of air throughout a stack of trays. This position also allows, for a large-sized tray, which corresponds to another aspect of the invention, improving the mechanical strength of the tray, throughout its life cycle.

The tray may include nine feet, namely:
the four feet previously defined
two feet located in a longitudinal midplane of the tray, at a distance from the short sides of the tray,
two feet located in a transverse midplane of the tray, on the long sides of the tray, and
a central foot, at the intersection of the longitudinal midplane and the transverse midplane.

The tray may have a length comprised between 0.6 m and 3.6 m, and preferably 2.4 m, and a width comprised between 0.4 m and 2.0 m, and preferably 1.2 m.

The tray body may have a height comprised between 30 mm and 200 mm.

Thus, an optimum distribution of the feet is proposed, in particular for a large-sized tray. Indeed, the tray may have dimensions based on those of a standard size pallet. In particular, the tray may have the dimensions of a "Europe" pallet, namely 1.20 m by 0.80 m or a multiple of these dimensions, for example 2.40 m (namely three times 0.80 m) by 1.20 m. This facilitates handling thereof and makes the tray, and the stacks of trays, compatible with pallet transport and storage devices (pallet truck, shelves or pallet "racks"). Thus, the lower tray of a stack of trays could serve as a handling support, forming some kind of pallet, in the absence of a pallet strictly speaking.

The feet of the tray may have an oblong cross-section, for example a rectangular cross-section with rounded corners or an elliptical cross-section.

An elongated shape of the section of the feet allows, with an appropriate orientation, limiting the front surface area exposed to the airflow, while guaranteeing the absorption of considerable vertical forces.

Moreover, the elongated shape of the section of the feet allows having a bearing surface between stacked trays that is enough to hold the load (weight of the upper trays). Indeed, a stack of trays in accordance with the invention could, for example, weigh up to 1.5 tonnes.

Finally, the orientation of the feet allows maximizing the useful surface in the trays. Each foot may include, over its upper bearing surface, a stud projecting from said upper bearing surface. The tray may include, for each foot, an added insert forming the lower bearing surface of the foot, said insert having a concavity with a shape corresponding, except for a functional clearance, to the shape of the stud.

These features allow for a reliable stacking of the trays, which are thus positioned accurately with respect to one another during stacking thereof. They confer on the stacks of trays a cohesion suited to movement thereof by automated means.

The inserts also allow for a mechanical reinforcement of the feet (which may be essentially hollow).

The tray enclosure may extend substantially parallel to the bottom of the tray, and each foot may extend above the enclosure of the tray over a height comprised between 20% and 100% of the height of the tray body, measured between the bottom of the tray and the enclosure of the tray.

This guarantees good aeration of the trays.

The bottom of the tray may have a reinforcing pattern, in the form of convexities formed on the bottom of the tray or of ribs with small heights forming a hexagonal or triangular geometric pattern on the bottom of the tray.

Such reinforcements allow obtaining a large-sized tray that is rigid enough. The reinforcement pattern may be adapted according to the purpose of the tray, and be different for example for trays intended for the farming of insect larvae and growth thereof and for trays intended for the reproduction and egg-laying of insects.

The tray may have an internal volume divided into several areas by at least one vertical partition, for example into two to eight areas (12), for example into six areas (12).

This allows reinforcing the tray, in bending and in torsion. This also allows carrying out farming on unitary areas each having a closed surface in which the behaviour of the insects during farming thereof is known, and has been deemed suitable for farming.

The invention also relates to a stack of trays. This stack includes several stacked trays, and the lower tray of the stack forms a handling support for lifting and moving said stack of trays.

Other specific features and advantages of the invention will also become apparent in the following description.

In the appended drawings, given by way of non-limiting examples:

Figure 1:
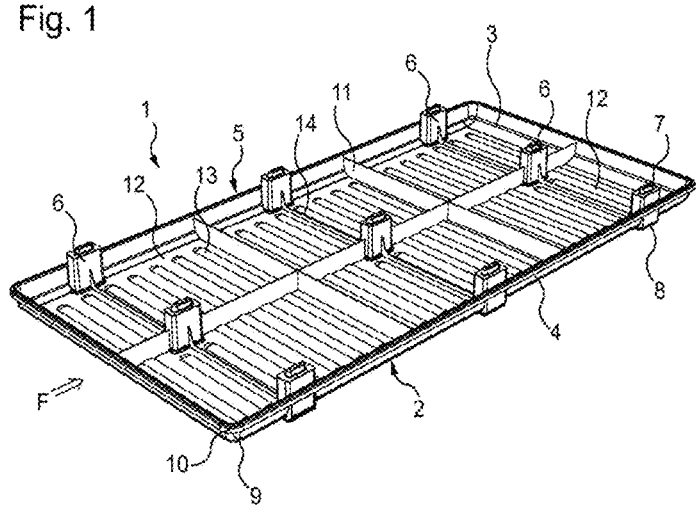
FIG. 1 represents, according to a schematic three-dimensional view, an insect farming tray according to an embodiment of the invention.

The tray 1 includes a bottom 2 which is solid and an opposite open face 3. The tray 1 is suited for farming crawling or essentially crawling insects, or flying insects at the egg, larva, or nymph stage.

The bottom 2 of the tray 1 extends according to a general extension plane considered as horizontal. Indeed, when farming insects in the tray, the bottom of the tray is configured to be disposed horizontally.

The tray includes side walls 4. With the bottom 2, the side walls thus form a tray body. The tray body enables the reception of the insects and, where appropriate, the substrate useful for farming thereof. The farming substrate corresponds to the material used to create a living environment for the insects, and, optionally, including the nutrient elements necessary for growth thereof.

The side walls 4 of the tray define an enclosure of the tray 5, formed by an upper flange of said side walls 4. The enclosure of tray 5 extends parallel to the bottom of tray 2, i.e. horizontally. In particular, the enclosure of the tray 5 extends horizontally all around the tray body.

The tray 1 includes feet 6.

The feet 6 extend in the vertical direction (perpendicular to the horizontal) from the bottom 2 of the tray, i.e. from the horizontal plane defined by the bottom 2, up to beyond the enclosure 5 of the tray 1.

Each foot 6 includes an upper bearing surface 7 and a lower bearing surface 8.

Thus, the tray 1 is configured to be stacked on top of or under an identical tray. Thus, a stack of trays 1 may be formed, wherein, with the exception of the lowest tray of the stack, the lower bearing surface 8 of each foot bears on the upper bearing surface 7 of the corresponding foot of the tray located below.

In comparison with the trays known in the prior art, the tray 1 object of the invention has the particularity of being devoid of sharp edges. In the represented example, the tray has a substantially flattened parallelepipedic shape (yet without excluding that the side walls 4 could confer a slightly flared shape on the tray body). Thus, the tray body has rounded corners. The corners of the tray body and of the tray 1 correspond to the vertical edges 9 of the tray, formed at the junction of two successive side walls 4 of the tray, and to the corner flanges 10 formed by the tray enclosure 5 at this level.

In general, the edges of the tray 1 likely to be exposed to an airflow generated to cross a stack of trays and thus renew the air present in and around the trays, whether these are edges of the tray body or feet, are rounded.

The tray 1 includes vertical partitions 11 which divide the tray into several areas 12. The vertical partitions 11 are longitudinal and/or transverse.

Advantageously, the tray 1 is made of a plastic material. Advantageously, a food grade material is used. Thus, the tray 1 may in particular be made of polypropylene. The tray 1 may be made using an injection moulding process.

Preferably, the areas 12 have identical or similar dimensions.

Figure 2:
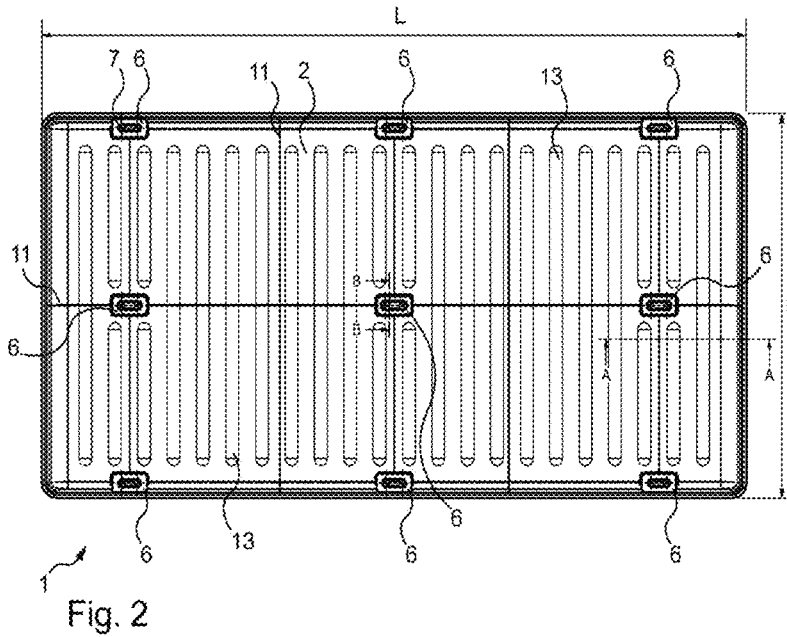
FIG. 2 represents, according to a top view, the tray of FIG. 1

FIG. 2 represents, according to a top view, the tray of FIG. 1.

The tray has large dimensions, in comparison with the farming trays known in the prior art. The tray body having a small height h in comparison with its length L and with its width l, the tray may also be referred to by the term farming "tray".

In the example represented herein, the tray 1 has a length of 2.40 m and a width of 1.20 m.

Thus, each area 12 has a length of about 80 cm and a width of about 60 cm. This corresponds to the dimensions of the trays whose good suitability to the farming of insects, in particular at the larval stage, has been validated.

In order to reinforce the bottom 2 of the tray, which is necessary or preferable, in particular because of its large dimensions, the bottom of the tray has a reinforcement pattern. The reinforcement pattern includes, in the represented example, a series of convexities 13 (viewed from inside the tray) which extend transversely (along the direction of the width) of the tray 1.

FIGS. 1 and 2 also illustrate a preferred arrangement of the feet. In particular, the four feet located proximate to the corners of the tray 1 are located on a long side of the tray (the side extending along the length of the tray 1) but at a distance from the short sides of the tray (the sides extending along the width of the tray 1). In particular, these four feet may be disposed at a distance of 10 cm to 50 cm from the closest short side, for example at about 20 cm, 30 cm, or 40 cm from this short side. A foot 6 is also located at the middle of the tray, according to the transverse direction, in alignment respectively with each group of two feet located on the long sides of the tray, proximate to a short side of the tray.

Three feet are also disposed according to a longitudinal centreline of the tray, a foot 6 being located on each of the long sides of the tray, and a foot 6 at the middle of the tray in the transverse direction.

In order to further reinforce the tray 1, in bending and in torsion, the feet 6 which are aligned transversely are connected together by ribs 14 formed on the bottom 2 of the tray 1. The ribs 14 have a small height, in comparison with the height h of the tray body, and do not form a partitioning in the areas 12.

Thus, the tray configured so as to have mechanical characteristics, in particular in terms of rigidity and resistance to the load, enabling the lower tray of a stack of trays to serve as a handling support for the transport of a complete stack of trays.

Figure 3:
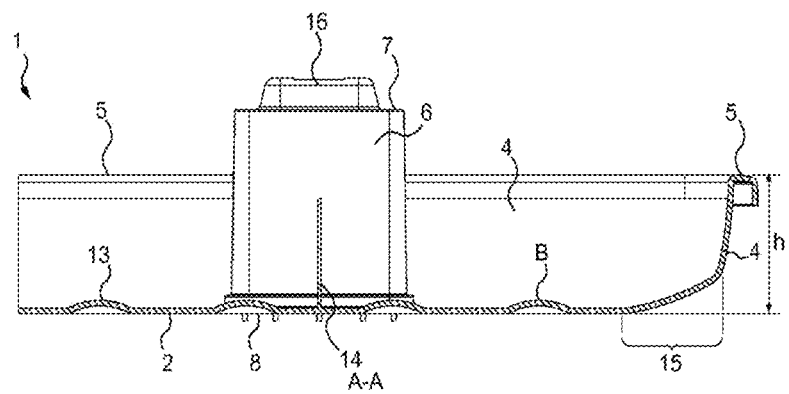
FIG. 3 represents, according to a first partial sectional view, the tray of FIGS. 1 and 2.

FIG. 3 represents the tray of FIGS. 1 and 2, according to a first partial sectional view according to the section plane A-A represented in FIG. 2. This partial sectional view shows a longitudinal end of the tray 1.

Thus, the tray comprises, at its longitudinal end (and in this case at each of its longitudinal ends) a raised portion 15. The raised portion forms an angle, and/or a curvature, evolving or not, with respect to the horizontal materialised by the general extension plane of the bottom 2.

In the example represented herein, the raised portion 15 extends over about 50 mm in the longitudinal direction. For example, the raised portion may extend over 20 mm to 150 mm, according to various embodiments of the invention. The raised portion herein includes an inclined portion connecting progressively to the bottom 2 of the tray on the one hand, and to the side wall 4 of the small side of the tray on the other hand.

The raised portion 15 confers on the tray 1, and in particular on the tray body, a shape comparable to that of a boat or a flat-bottomed boat hull. This considerably improves the aerodynamics of the tray, by reducing its drag coefficient with respect to an air flow F whose direction is represented by a double arrow in FIG. 1.

Thus, the tray 1 is intended for use according to a particular orientation with respect to the predominant airflow which will cross the stacks of trays during the farming of insects.

As regards the feet 6, as shown in particular in FIGS. 1 to 4, they are also configured according to the orientation of use of tray 1. Thus, the feet 6 have a section of elongated, oblong shape, the largest dimension of the section of the foot being oriented according to the airflow (i.e., in the represented example, according to the longitudinal direction), so as to minimise the frontal surface of each foot with respect to the airflow.

Thus, each foot 6 may have an elliptical, rectangular section (with rounded corners), or any other oblong section, for example including a rectangular central portion and two semi-circles on either side of this central section.

FIG. 3 also allows assessing the dimensions of the feet in the represented tray example, in comparison with the height h of the tray body.

In the represented example, the tray body has a height h in the range of 90 mm. According to various embodiments, the height h may for example be comprised between 40 mm and 120 mm). In turn, the upper bearing surface 7 of the foot 6 is located about 40 mm above the enclosure 5 of the tray 1. In other words, the foot has, in this embodiment, a total height between its lower bearing surface 8 and its upper bearing surface 7, in the range of 130 mm (the lower bearing surface of the foot being located in the same plane, or substantially in the same plane as the bottom 2. According to various embodiments, the upper bearing surface of the foot may be located for example between 10 mm and 120 mm above the enclosure of the tray.

When stacking an identical tray on tray 1, the lower bearing surface of each foot of said identical tray bears on the upper bearing surface 7 of the corresponding foot of said tray 1.

Thus, a space is provided for the circulation of air between the enclosure 5 of the tray delimiting its open face 3 and the bottom of the identical tray. Thanks to the positioning of the feet set back with respect to the short side of the tray, this space is completely free for the entry of air between the trays at said short side.

Figure 4:
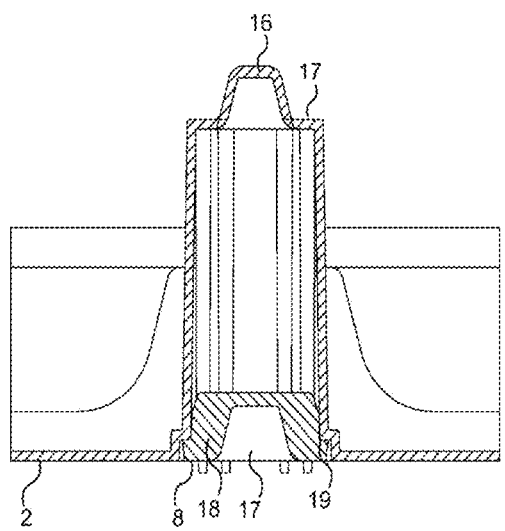
FIG. 4 represents, according to a second partial sectional view, the tray of FIGS. 1 to 3.

As shown in FIGS. 3 and 4, each foot include, on its upper bearing surface, a stud 16 which projects from the upper bearing surface 7. For example, the stud 16 may have a height in the range of 20 mm. This stud is shaped so as to have a shape matching, except for a functional clearance, with a concavity formed on the lower bearing surface 8.

FIG. 4 is a partial sectional view of the tray 1, according to the section plane B-B represented in FIG. 2. FIG. 4 illustrates many aspects of the construction of a foot. Thus, in the embodiment represented herein, each foot 6 is hollow. The lower bearing surface 8 is formed by an added insert 18.

The insert 18 is configured to be forcibly fitted and/or fastened by riveting (or fixed by any other suitable means, for example welded or glued) in the volume defined by the wall of the foot 6, and to be supported on a seat 19 formed by this wall.

The insert may be made of a plastic material, for example of polypropylene, in particular according to an injection moulding process.

Figure 5:
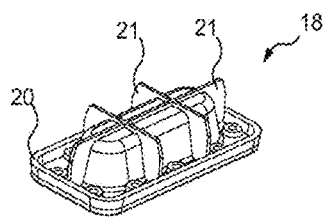
FIG. 5 represents, according to a schematic three-dimensional view, an example of an insert that can be used in the invention.

Such an insert 18 is represented in detail in FIG. 5, in a three-dimensional view. Thus, the insert 18 includes a bearing side 20 intended to bear on the seat 19 of the foot. The insert 18 also includes fins 21 which bear on the inner walls of the foot 6 (which is hollow) and which mechanically reinforces it.

Figure 6:
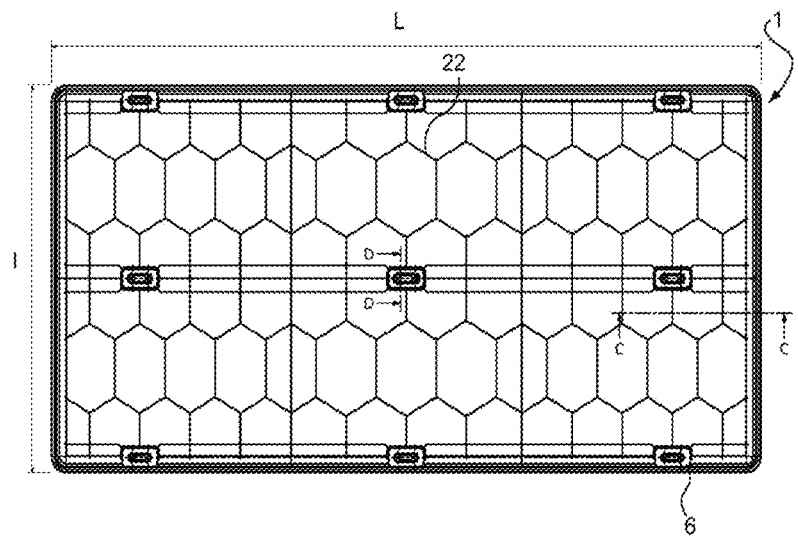
FIG. 6 represents, according to a top view, a tray according to another embodiment of the invention.
Figure 7:
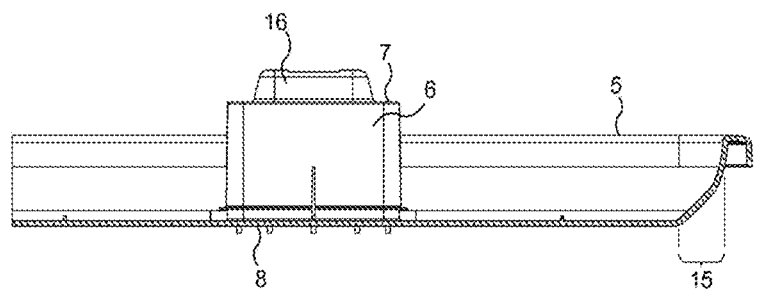
FIG. 7 represents, according to a first partial sectional view, the tray of FIG. 6.
Figure 8:
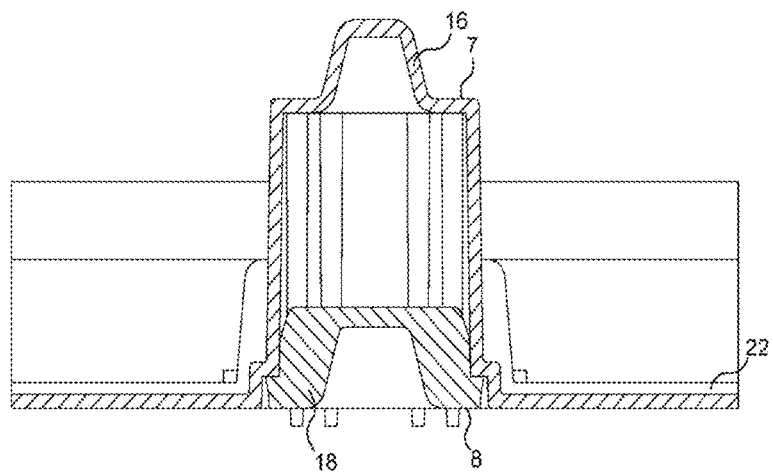
FIG. 8 represents, according to a second partial sectional view, the tray of FIGS. 6 and 7.

FIGS. 6 to 8 represent a tray according to another embodiment of the invention. FIG. 6 is a top view, FIG. 7 is a partial sectional view according to the section plane CC represented in FIG. 6, FIG. 7 is a partial sectional view according to the section plane DD represented in FIG. 6.

The insect farming tray in FIG. 6 has the same general configuration as the tray of FIGS. 1 to 4. In particular, the length L and the width l of the tray 1 may be identical to those of the tray of FIGS. 1 to 4 (for example L=2.40 m and l=1.20 m). The feet 6 may have the same arrangement as in the tray of FIGS. 1 to 4. They may have the same cross-section. The studs 16 and the concavities 17 of the feet may also be identical.

Thus, the tray of FIGS. 1 to 4 and the tray of FIGS. 6 to 8 can be stacked together.

While the description given hereinbefore of the tray of FIGS. 1 to 4 thus applies to the tray of FIGS. 6 to 8, the latter nevertheless has the following distinctive features.

The tray of FIGS. 6 to 8 has on its bottom 2 a reinforcement pattern consisting of ribs 22 with a small height arranged as hexagons. The mechanical reinforcement, in particular in terms of rigidity in all directions, obtained with such a pattern, is greater than the reinforcement obtained with the concavities of the tray of FIGS. 1 to 4. Nevertheless, this pattern is more complex to manufacture.

The tray of FIGS. 6 to 8 also has a smaller height than the tray of FIGS. 1 to 4. In the example represented herein, the tray body has a height h in the range of 60 mm. In turn, the upper bearing surface 7 of the foot 6 is located about 20 mm above the enclosure 5 of the tray 1. In other words, the foot has, in this embodiment, a total height between its lower bearing surface 8 and its upper bearing surface 7, in the range of 80 mm.

In this embodiment, the raised portion 15 of the tray has a length in the range of 30 mm.

The distinctive features of the tray of FIGS. 6 to 8 described hereinabove may be applied individually or in combination, according to various embodiments of the invention.

While the tray of FIGS. 1 to 3 is particularly well suited to farming of insect larvae and growth thereof, the tray of FIGS. 6 to 8 is particularly well suited to the reproduction and egg-laying of insects.

Thus, for example, the tray of FIGS. 1 to 3 can be used to form stacks of 15 to 20 trays, for example 18 trays.

For example, the tray of FIGS. 6 to 8 can be used to form stacks of 25 to 40 trays, for example 32 trays.

These stacks can be moved by automated means using the bottom tray of the stack as a handling support (excluding in particular the use of a pallet as a handling support).

Figure 9:
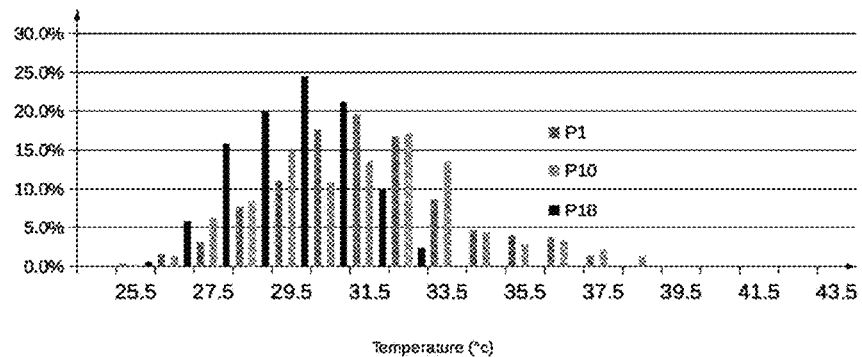
FIG. 9 represents a graph illustrating the distribution of the temperature in the trays of a set of stacked straight-sided trays, not corresponding to the present invention.
Figure 10:
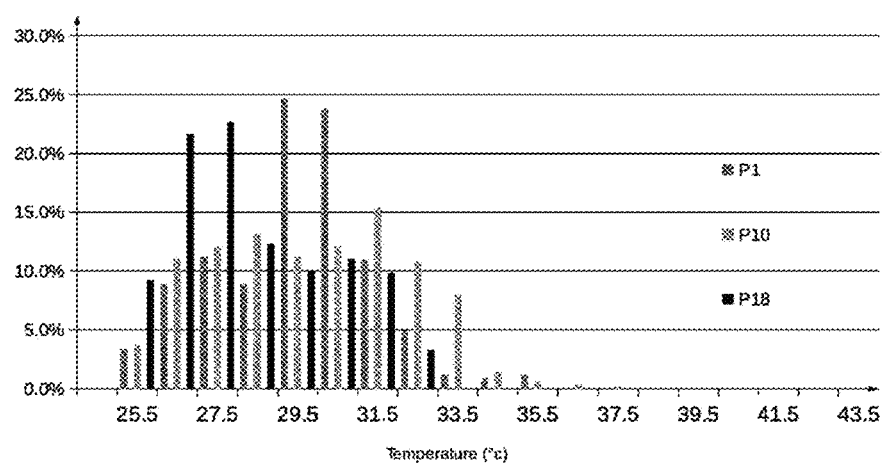
FIG. 10 represents a graph illustrating the temperature distribution in the trays of a set of stacked trays according to an embodiment of the invention.

FIGS. 9 and 10 illustrate a first major advantage obtained thanks to the aerodynamics of a farming tray in accordance with the invention.

FIGS. 9 and 10 represent, for given thermal load and ventilation conditions identical for both FIG. 9 and FIG. 10, the modelled temperature in trays located at different levels of several sets of stacked trays. In particular, sets of eighteen stacked trays are considered, present in a large-scale insect farm, with a thermal regulation device ensuring air circulation in the farm. The considered insect farm corresponds in particular to a farm of the type described in the document WO2020104751. The temperature distribution in the trays of these sets is represented. In particular, in FIGS. 9 and 10, for each range of 1° C. between 24° C. and 44° C. (on the abscissa axis), the percentage of trays in the temperature range (on the ordinate axis) is represented for:

the first tray (located at the top of the stack) referenced P1, the tenth tray of the stack starting from the top, referenced P10, the last tray in the stack (at the bottom of the stack), referenced P18.

FIG. 9 corresponds to a model with trays having a strictly right parallelepipedic tray body, having sharp edges (not rounded), and which are referred to hereinafter as "straight-sided trays".

FIG. 10 corresponds to a model with trays in accordance with an embodiment of the invention, namely trays corresponding to the tray of FIG. 1.

In the represented example, the comparison of FIG. 9 and FIG. 10 shows a much better temperature homogeneity thanks to the trays in accordance with the present invention. Furthermore, the number of trays exceeding too high a temperature, in this case 34° C. in the represented example, is quite significantly reduced.

This promotes the obtainment of an optimum temperature for farming a higher proportion, and even almost all, of the insects in the farm, in comparison with a farm in which straight-sided trays would be used.

Under the conditions illustrated in FIGS. 9 and 10, one could notice that the sets of stacked trays are on average hotter when the trays forming them have straight sides. Yet, the evacuation of the heat produced by the insects is a major issue in large-scale insect farming. In the represented example, the average temperature differences in the sets of stacked trays, according to the position of these sets in the farm, is comprised between 0.35° C. and 0.9° C. between straight-sided trays and trays in accordance with the present invention.

To obtain the same average temperature in straight-sided trays as in the trays in accordance with the invention according to the embodiment illustrated in FIG. 1, it is estimated that a ventilation flow rate higher by about 10% would be necessary. This has a considerable energy impact in large-scale farming.

The airflow flowing between the trays of a set of stacked trays also turns out to be very different depending on whether the trays are straight-sided or optimised according to the present invention.

Figure 11:
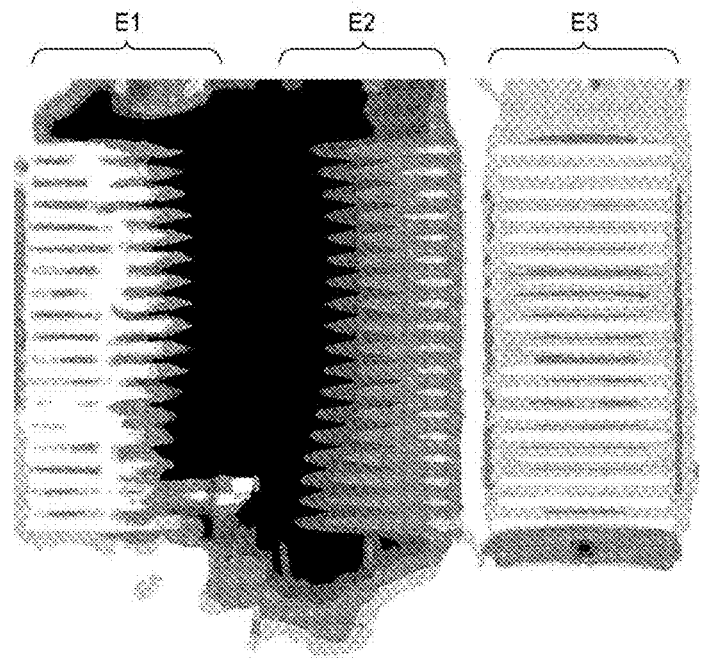
FIG. 11 represents a graph illustrating the air speed at the inlet of columns of stacked straight-sided trays, not corresponding to the present invention.
Figure 12:
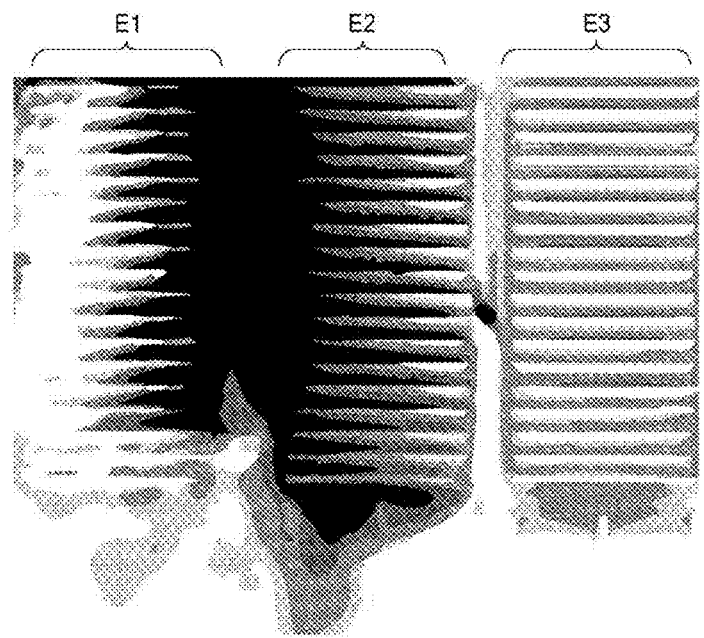
FIG. 12 represents a graph illustrating the air speed at the inlet of columns of stacked trays in accordance with an embodiment of the invention.

As illustrated in FIGS. 11 and 12, the optimisation of the shape of the trays allows for a better penetration of the airflow between the trays, and therefore an increase in the flow crossing the sets of stacked trays, which promotes cooling thereof and more generally the renewal of the air in the trays.

Thus, each of FIGS. 11 and 12 represents the air speed modelled at the inlet of three sets of stacked trays, respectively referenced E1, E2 and E3.

An air induction duct is located opposite said sets of trays, between the first set E1 and the second set E2. The air induction is identical in FIG. 11 and in FIG. 12.

In FIGS. 11 and 12, the areas with the highest air speed correspond to the darkest areas, whereas the lighter areas correspond to the areas where the air circulates the slowest.

The areas where the air circulates at the highest speed are naturally located opposite the air induction duct.

The comparison of FIG. 11 and FIG. 12 shows that the areas where the air flows at a significant speed extend more along the width of the first set E1 and the second set E2 with trays in accordance with the invention (FIG. 12) than with straight-sided trays (FIG. 11). In particular, one could notice that in the represented example, an airflow is properly established over the entire width of the trays of the second set E2 with trays in accordance with the invention, while this is not the case with straight-sided trays. Finally, as regards the third set E3, while the air circulation takes place at a very low speed with straight-sided trays, trays in accordance with the present invention allow for a substantially improved air circulation, the airflow flowing at a significant speed.

Finally, the Applicant has noticed that straight-sided trays result in "dead" areas at the entrance between the trays, i.e. areas in which no, or almost no, air flows. These areas are reduced and even eliminated thanks to the use of trays in accordance with the invention.

The insect farming tray thus proposed in the invention has many advantages in comparison with the trays known in the prior art. First of all, the tray is optimised to impede the airflow as little as possible in a stack of several trays, according to at least one direction. This aerodynamic conformation of the tray allows for a good maintenance of the desired environmental parameters in each tray (temperature, $CO_2$ level, etc.). On the scale of a farming factory, this also allows for considerable energy (and therefore also economic) savings in the used aeraulic systems. A less powerful airflow could be used, which disturbs insect growth less, and/or a greater number of stacks of trays could be crossed by an airflow of a given power.

In some embodiments, large-sized trays are particularly well suited to farming using automated means for moving the trays and vertical storage in large-sized storage structures.

The invention claimed is:

1. A tray for farming insects, comprising:
a solid bottom (2), defining a substantially horizontal plane,
side walls (4) defining a peripheral enclosure (5) of the tray, the bottom (2) and the side walls (4) defining a tray body, and
feet (6) extending vertically from the bottom (2) of the tray up to a level located above the peripheral enclosure (5) of the tray,
said feet (6) being configured to enable a stacking of an identical insect farming tray on top of said farming tray, while leaving a space between the bottom (2) of said identical tray and the peripheral enclosure (5) of the tray, said feet (6) comprising an upper bearing surface (7) configured to cooperate with a lower bearing surface (8) of the feet (6) of said identical tray;
wherein the body of the tray has no sharp edges and comprises only rounded edges, so as to limit disruptions to a laminar air flow flowing around the tray;
wherein the body of the tray has a rectangular parallelepiped general shape comprising a height, a length, and a width, the height (h) being smaller than the length (L) and smaller than the width (l), and wherein the body of the tray comprises rounded, vertical edges; and
wherein said tray comprises four feet (6), two of said four feet (6) being located on a first long side of the tray extending along its length (L), and two of said four feet (6) being located on a second long side of the tray extending along its length (L), said four feet (6) being located at a distance of 10 cm to 50 cm from the closest short side among a first short side of the tray extending along its width and a second short side of the tray extending along its width.

2. The tray for farming insects according to claim 1, wherein the feet (6) have only vertical, rounded edges.

3. The tray for farming insects according to claim 1, wherein the bottom (2) of the tray comprises, at each of its longitudinal ends, a raised portion (15) with respect to the horizontal.

4. The tray for farming insects according to claim 1, comprising nine feet (6), namely:
the four feet (6) defined in claim 1,
two feet (6) located in a longitudinal midplane of the tray, at a distance from the short sides of the tray,
two feet (6) located in a transverse midplane of the tray, on the long sides of the tray, and
a central foot, at the intersection of the longitudinal midplane and the transverse midplane.

5. The tray for farming insects according to claim 1, said tray having a length of 0.6 m to 3.6 m and a width of 0.4 m to 2.0 m.

6. The tray for farming insects according to claim 1, wherein the tray body has a height of 30 mm to 200 mm.

7. The tray for farming insects according to claim 1, wherein the peripheral enclosure (5) of the tray extends substantially parallel to the bottom (2) of the tray, and each foot (6) extends above the peripheral enclosure (5) of the tray over a height comprised between 20% and 100% of the height of the tray body, measured between the bottom (2) of the tray and the peripheral enclosure (5) of the tray.

8. The tray for farming insects according to claim 1, wherein the bottom (2) of the tray has a reinforcing pattern, in the form of convexities (13) formed on the bottom (2) of the tray or of ribs (22) forming a hexagonal or triangular geometric pattern on the bottom (2) of the tray.

9. A stack of trays consisting of several stacked trays for farming insects according to claim 1, the lower tray of which forms a handling support allowing lifting and moving said stack of trays.

10. The tray for farming insects according to claim 1, said tray having a length of 2.4 m and a width of 1.2 m.

11. The tray for farming insects according to claim 1, wherein the feet (6) have an oblong cross-section.

12. The tray for farming insects according to claim 11, wherein the oblong cross-section is a rectangular cross-section with rounded corners or an elliptical cross-section.

13. The tray for farming insects according to claim 1, wherein each foot (6) comprises, over its upper bearing surface (7), a stud (16) projecting from said upper bearing surface (7).

14. The tray for farming insects according to claim 13, comprising, for each foot (6), an attached insert (18) forming the lower bearing surface (8) of the foot, said insert (18) having a concavity with a shape corresponding to the shape of the stud (16).

15. The tray for farming insects according to claim 1, said tray having an internal volume divided into several areas by at least one vertical partition.

16. The tray for farming insects according to claim 15, wherein said several areas are two to eight areas (12).

17. The tray for farming insects according to claim 15, wherein said several areas are six areas (12).

* * * * *